United States Patent
Makino

(10) Patent No.: US 11,043,332 B2
(45) Date of Patent: Jun. 22, 2021

(54) MULTILAYER CERAMIC CAPACITOR

(71) Applicant: TAIYO YUDEN CO., LTD., Tokyo (JP)

(72) Inventor: Toru Makino, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/438,618

(22) Filed: Feb. 21, 2017

(65) Prior Publication Data

US 2017/0250028 A1 Aug. 31, 2017

(30) Foreign Application Priority Data

Feb. 26, 2016 (JP) .............................. JP2016-035707

(51) Int. Cl.
*H01G 4/30* (2006.01)
*H01G 4/232* (2006.01)
(Continued)

(52) U.S. Cl.
CPC ............... *H01G 4/30* (2013.01); *H01G 4/005* (2013.01); *H01G 4/012* (2013.01); *H01G 4/232* (2013.01); *H01G 4/248* (2013.01); *H01G 4/12* (2013.01)

(58) Field of Classification Search
CPC ............ H01G 4/30; H01G 4/12; H01G 4/232; H01G 4/005; H01G 4/248; H01G 4/012; H10G 4/005
(Continued)

(56) References Cited

U.S. PATENT DOCUMENTS

2010/0118467 A1* 5/2010 Takeuchi ............... H01G 4/232
361/306.3
2013/0058005 A1* 3/2013 Oh ......................... H01G 4/005
361/305
(Continued)

FOREIGN PATENT DOCUMENTS

CN       102610388 A    7/2012
CN       104576053 A    4/2015
(Continued)

OTHER PUBLICATIONS

A Notification of Reasons for Refusal issued by the Japanese Patent Office, dated Jan. 17, 2018, for Japanese counterpart application No. 2016-035707.
(Continued)

*Primary Examiner* — Arun Ramaswamy
(74) *Attorney, Agent, or Firm* — Law Office of Katsuhiro Arai

(57) ABSTRACT

In an embodiment, a multilayer ceramic capacitor 10 includes a capacitor boy 11 which has a sixth face f6 provided with a first tapering face f6a over the entire width direction and at a position adjacent to a first face f1, and which also has a second tapering face f6b over the entire width direction and at a position adjacent to a second face f2. The height-direction dimension of the first tapering face f6a on the sixth face f6 is constituted in a manner accommodating an error in the end height of the first part 12a of the first external electrode 12, while the height-direction dimension of the second tapering face f6b on the sixth face f6 is constituted in a manner accommodating an error in the end height of the first part 13a of the second external electrode 13.

20 Claims, 3 Drawing Sheets

(51) Int. Cl.
*H01G 4/012* (2006.01)
*H01G 4/12* (2006.01)
*H01G 4/248* (2006.01)
*H01G 4/005* (2006.01)

(58) Field of Classification Search
USPC ......... 361/306.1, 321.1, 301.4, 321.2, 306.3, 361/321.3
See application file for complete search history.

(56) References Cited

U.S. PATENT DOCUMENTS

| | | | | |
|---|---|---|---|---|
| 2013/0070386 A1* | 3/2013 | Kim | ........................ | H01G 4/30 361/301.4 |
| 2014/0049873 A1* | 2/2014 | Nishisaka | .............. | H01G 4/232 361/308.1 |
| 2014/0209364 A1* | 7/2014 | Oh | .......................... | H01G 4/30 174/260 |
| 2015/0325377 A1* | 11/2015 | Takeuchi | ................. | H01G 4/30 361/301.4 |

FOREIGN PATENT DOCUMENTS

| | | |
|---|---|---|
| CN | 105097277 A | 11/2015 |
| JP | 2012164966 A | 8/2012 |
| JP | 2015026841 A | 2/2015 |
| JP | 2015228481 A | 12/2015 |

OTHER PUBLICATIONS

First Office Action issued by the State Intellectual Property Office of China dated Nov. 27, 2019 for Chinese counterpart application 201710007101.5 (7 pages).

* cited by examiner

MULTILAYER CERAMIC CAPACITOR

BACKGROUND

Field of the Invention

The present invention relates to a multilayer ceramic capacitor constituted by a capacitor body and external electrodes of roughly L shape provided on the opposing ends thereof.

Description of the Related Art

A known configuration of external electrodes provided on the opposing ends of a multilayer ceramic capacitor involves external electrodes of roughly L shape, each having a part along one length-direction face, and a part along one height-direction face, of the capacitor body (refer to Patent Literature 1 mentioned later). A conventional multilayer ceramic capacitor having these external electrodes of roughly L shape is explained below using FIGS. 1A through 1C.

As shown in FIG. 1A, the size of the multilayer ceramic capacitor 100 is specified by length L, width W (not illustrated), and height H. This multilayer ceramic capacitor 100 has a capacitor body 101 of roughly rectangular solid shape, a first external electrode 102 of roughly L shape, and a second external electrode 103 of roughly L shape.

The capacitor body 101 has a first face and a second face that are facing each other in the length direction (left face and right face in FIG. 1A), a third face and a fourth face that are facing each other in the width direction (front face and back face not illustrated in FIG. 1A), and a fifth face and a sixth face that are facing each other in the height direction (bottom face and top face in FIG. 1A). Also, the capacitor body 101 has a built-in capacitive part (not accompanied by symbol) constituted by multiple first internal electrode layers 104 and multiple second internal electrode layers 105 that are stacked alternately with dielectric layers 106 in between, wherein both sides in the width direction, and both sides in the height direction, of the capacitive part, are covered with dielectric margin parts (not accompanied by symbol). One length-direction end (left end in FIG. 1A) of each first internal electrode layer 104 constitutes a lead part 104a, while one length-direction end (right end in FIG. 1A) of each second internal electrode layer 105 constitutes a lead part 105a.

The first external electrode 102 has a first part 102a along the first face of the capacitor body 101 and a second part 102b along the fifth face of the capacitor body 101, where an end of each first internal electrode layer 104 is connected to the first part 102a. On the other hand, the second external electrode 103 has a first part 103a along the second face of the capacitor body 101 and a second part 103b along the fifth face of the capacitor body 101, where an end of each second internal electrode layer 105 is connected to the first part 103a. Although not illustrated, the first external electrode 102 and second external electrode 103 each have a two-layer structure constituted by a base film contacting the exterior face of the capacitor body 101 and a surface film contacting the exterior face of the base film, or a multi-layer structure constituted by a base film, a surface film, and at least one intermediate film in between.

Because its first external electrode 102 and second external electrode 103 each have a roughly L shape, the multilayer ceramic capacitor 100 shown in FIG. 1A allows the height-direction dimension of its capacitor body 101 to be designed larger than that of a multilayer ceramic capacitor having the same external dimensions (length, width and height) but using U-shaped external electrodes that each have an additional part along the sixth face of the capacitor body 101, by the thickness of the part along the sixth face. Additionally, compared to those of a multilayer ceramic capacitor having the same external dimensions but using external electrodes of square cylinder shape with bottom that each have additional parts along the sixth face, third face, and fourth face of the capacitor body 101, respectively, the height-direction dimension and width-direction dimension of the capacitor body 101 of the multilayer ceramic capacitor 100 can be designed larger by the thicknesses of the parts along the sixth face, third face, and fourth face, respectively. In other words, the numbers and areas of first internal electrode layers 104 and second internal electrode layers 105 can be increased based on the dimensional expansion of the capacitor body 101, which is beneficial as it contributes to capacitance increase.

Meanwhile, multilayer ceramic capacitors in general, including the multilayer ceramic capacitor 100 shown in FIG. 1A, continue to face a demand for size reduction, and to meet this demand a recent trend is to design the thicknesses of the margin parts in the width direction, and margin parts in the height direction, of the capacitor body, smaller. In fact, multilayer ceramic capacitors whose width-direction margin parts and height-direction margin parts are less than 20 μm thick, respectively, are known.

However, because its first external electrode 102 and second external electrode 103 each have a roughly L shape, the multilayer ceramic capacitor 100 shown in FIG. 1A is subject to problems that do not occur when the external electrodes have a U shape or a square cylinder shape with bottom, if the thicknesses of the margin parts in the height direction become smaller, especially when the thickness of the margin part on the sixth face side (top face side in FIG. 1A) of the capacitor body 101 becomes smaller. This point is explained below.

The first part 102a of the first external electrode 102 is where an end of each first internal electrode layer 104 is connected, while the first part 103a of the second external electrode 103 is where an end of each second internal electrode layer 105 is connected, and accordingly the first part 102a and first part 103a must each have a sufficient height-direction dimension to make sure these connections are achieved in an appropriate manner.

However, an attempt to provide a sufficient height-direction dimension for the first part 102a of the first external electrode 102 and for the first part 103a of the second external electrode 103 causes the end height of the first part 102a (or first part 103a) to become slightly higher than the sixth face of the capacitor body 101, as shown in FIG. 1B, which is a problem in that the height H of the multilayer ceramic capacitor 100 changes and the aforementioned benefit of capacitance increase can no longer be achieved. Furthermore, an attempt to limit the height-direction dimension of the first part 102a of the first external electrode 102 and that of the first part 103a of the second external electrode 103 to avoid the foregoing causes the end height of the first part 102a (or first part 103a) to become slightly lower than the sixth face of the capacitor body 101, as shown in FIG. 1C, which is a problem in that the end of the top first internal electrode layer 104 is no longer connected to the first part 102a of the first external electrode 102. If the top electrode layer is the second external electrode layer 105, on the other hand, a problem occurs in that its end is no longer connected to the first part 103a of the second external electrode 103.

It should be noted that the above discussion of problems and solutions involved in the related art has been included solely for the purposes of providing a context for the present invention, and should not be taken as an admission that any or all of the discussion were known at the time the invention was made.

BACKGROUND ART LITERATURES

[Patent Literature 1] Japanese Patent Laid-open No. 2015-228481

SUMMARY

An object of the present invention is to provide a multilayer ceramic capacitor whose external electrodes can be formed properly without diminishing the benefit of capacitance increase, even when the thicknesses of the margin parts in the height direction of the capacitor body are designed smaller.

To achieve the aforementioned object, the multilayer ceramic capacitor proposed by the present invention is a multilayer ceramic capacitor comprising: (1) a capacitor body having a first face and a second face that are facing each other in the length direction, a third face and a fourth face that are facing each other in the width direction, and a fifth face and a sixth face that are facing each other in the height direction, as well as a built-in capacitive part constituted by multiple first internal electrode layers and multiple second internal electrode layers stacked alternately with dielectric layers in between; (2) a first external electrode having a first part along the first face, and a second part along the fifth face, of the capacitor body, where an end of each of the multiple first internal electrode layers is connected to the first part; and (3) a second external electrode having a first part along the second face, and a second part along the fifth face, of the capacitor body, where an end of each of the multiple second internal electrode layers is connected to the first part; wherein the sixth face of the capacitor body has, over the entire width direction and at a position adjacent to the first face, a first tapering face that decreases the height-direction dimension of the first face, and also has, over the entire width direction and at a position adjacent to the second face, a second tapering face that decreases the height-direction dimension of the second face; and the height-direction dimension of the first tapering face on the sixth face is constituted in a manner accommodating an error in the end height of the first part of the first external electrode, while the height-direction dimension of the second tapering face on the sixth face is constituted in a manner accommodating an error in the end height of the first part of the second external electrode.

According to the present invention, a multilayer ceramic capacitor can be provided whose external electrodes can be formed properly without diminishing the benefit of capacitance increase, even when the thicknesses of the margin parts in the height direction of the capacitor body are designed smaller.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a longitudinal section view of a conventional multilayer ceramic capacitor, while

FIG. 5A is a view of the multilayer ceramic capacitor shown in FIG. 2 from the first face f1 side of the capacitor body, while

DESCRIPTION OF THE SYMBOLS

Figure 1A:
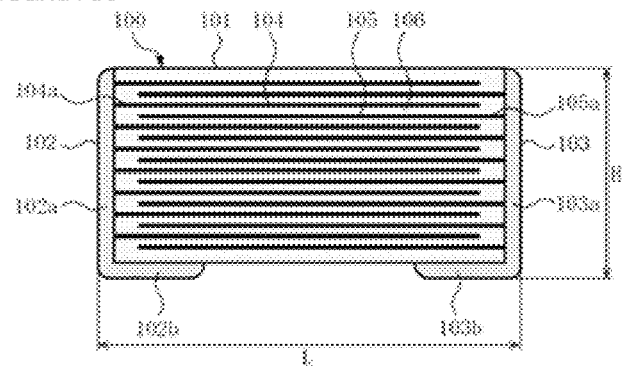

10—Multilayer ceramic capacitor, 11—Capacitor body, f1—First face of the capacitor body, f2—Second face of the capacitor body, f3—Third face of the capacitor body, f4—Fourth face of the capacitor body, f5—Fifth face of the capacitor body, f5a—First tapering face on the fifth face, f5b—Second tapering face on the fifth face, f6—Sixth face of the capacitor body, f6a—First tapering face on the sixth face, f6b—Second tapering face on the sixth face, D1—Height-direction dimension of the first tapering face, and that of the second tapering face, of the sixth face, 12—First external electrode, 12a—First part of the first external electrode, 12b—Second part of the first external electrode, 12c—Third part of the first external electrode, 13—Second external electrode, 13a—First part of the second external electrode, 13b—Second part of the second external electrode, 13c—Third part of the second external electrode.

DETAILED DESCRIPTION OF EMBODIMENTS

First, a multilayer ceramic capacitor 10 to which the present invention is applied is explained using FIGS. 2 to 6.

It should be noted that, while the multilayer ceramic capacitor 10 depicted in FIGS. 2 to 6 has its length L, width W, and height H as described below meeting a relationship of "Length L>Width W=Height H," the relationship of length L, width W, and height H can be "Length L>Width W>Height H," "Length L>Height H>Width W," "Width W>Length L=Height H," "Width W>Length L>Height H," or "Width W>Height H>Length L." Also, while the number of the first internal electrode layers 14 as described below is eight and that of the second internal electrode layers 15 as described below is also eight, and the number of the dielectric layers 16 as described below is 15, this is merely for the purpose of illustration and the number of first internal electrode layers 14 and that of second internal electrode layers 15 can be nine or more (the number of dielectric layers 16 is 17 or more), or seven or less (the number of dielectric layers 16 is 13 or less).

The size of the multilayer ceramic capacitor 10 is specified by its length L, width W, and height H. This multilayer ceramic capacitor 10 has a capacitor body 11 of roughly rectangular solid shape, a first external electrode 12 of roughly L shape, and a second external electrode 13 of roughly L shape.

The capacitor body 11 has a first face f1 and a second face f2 that are facing each other in the length direction, a third face f3 and a fourth face f4 that are facing each other in the width direction, and a fifth face f5 and a sixth face f6 that are facing each other in the height direction. Also, the capacitor body 11 has a built-in capacitive part (not accompanied by symbol) constituted by eight first internal electrode layers 14 and eight second internal electrode layers 15 that are stacked alternately with dielectric layers 16 in between, wherein both sides in the width direction, and both sides in the height direction, of the capacitive part, are covered with dielectric margin parts (not accompanied by symbol). It should be noted that the eight first internal electrode layers 14 each have a rectangular contour, while the eight second internal electrode layers 15 each have a rectangular contour, and the contour dimensions and thickness of each first internal electrode layer 14 are roughly the same as the contour dimensions and thickness of each second internal electrode layer 15. Also, the 15 dielectric layers 16 each have roughly the same thickness.

One length-direction end (left end in FIG. 6) of each first internal electrode layer 14 constitutes a lead part 14a, where the end of each lead part 14a is led out to the first face f1 of the capacitor body 11, and each end is connected to the first part 12a as described below of the first external electrode 12. Also, one length-direction end (right end in FIG. 6) of each second internal electrode layer 15 constitutes a lead part 15a, where the end of each lead part 15a is led out to the second face f2 of the capacitor body 11, and each end is connected to the first part 13a, as described below, of the second external electrode 13.

The first face f1, second face f2, third face f3, and fourth face f4 of the capacitor body 11 are each a roughly smooth surface. The fifth face f5 is a convex curved face with a bulged center in the width direction, except for the parts corresponding to the first tapering face f5a and second tapering face f5b, as described below, while the sixth face f6 is a convex curved face with a bulged center in the width direction, except for the parts corresponding to the first tapering face f6a and second tapering face f6b as described below.

Additionally, the fifth face f5 of the capacitor body 11 has, over the entire width direction and at a position adjacent to the first face f1, a first tapering face f5a that decreases the height-direction dimension of the first face f1, and also has, over the entire width direction and at a position adjacent to the second face f2, a second tapering face f5b that decreases the height-direction dimension of the second face f2. The sixth face f6 of the capacitor body 11 has, over the entire width direction and at a position adjacent to the first face f1, a first tapering face f6a that decreases the height-direction dimension of the first face f1, and also has, over the entire width direction and at a position adjacent to the second face f2, a second tapering face f6b that decreases the height-direction dimension of the second face f2.

Figure 5A:
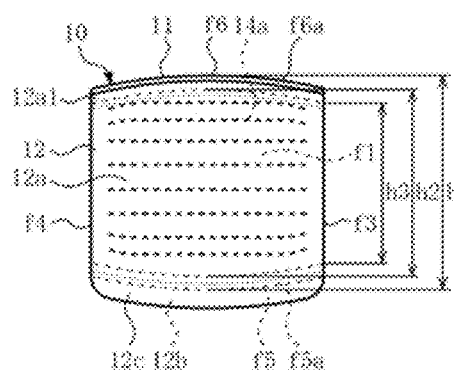
Figure 5B:
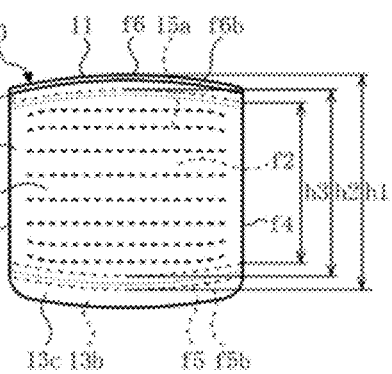
FIG. 5B is a view of the multilayer ceramic capacitor shown in FIG. 1 from the second face f2 side of the capacitor body.

To be specific, the first tapering face f5a on the fifth face f5 is a convex curved face having a bulged center in the width direction and inclined toward the first face f1, and the second tapering face f5b is also a convex curved face having a bulged center in the width direction and inclined toward the second face f2. The first tapering face f6a on the sixth face f6 is a convex curved face having a bulged center in the width direction and inclined toward the first face f1, and the second tapering face f6b is also a convex curved face having a bulged center in the width direction and inclined toward the second face f2. Referring to FIGS. 5A and 5B, the first tapering face f5a and second tapering face f5b on the fifth face f5 and the first tapering face f6a and second tapering face f6b on the sixth face f6 are convex curved faces, respectively, that satisfy the condition of "h1>h2>h3" where h1 represents the maximum height-direction dimension between the fifth face f5 and sixth face f6, h2 represents the maximum height-direction dimension of the first face f1 and that of the second face f2, respectively, and h3 represents the minimum height-direction dimension of the first face f1 and that of the second face f2, respectively.

Figure 6:
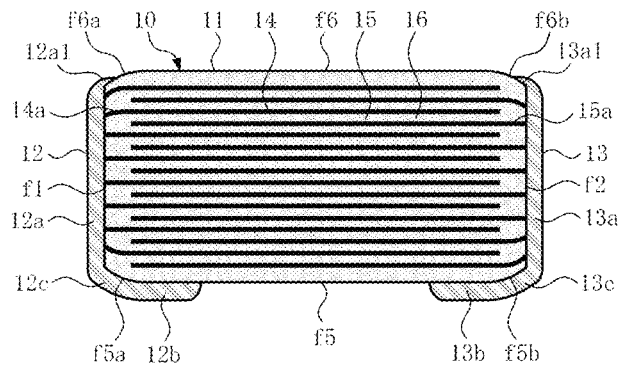
FIG. 6 is a section view of FIG. 2 along line S1-S1.

It is clear from FIG. 6 that, because the first tapering face f5a and second tapering face f5b on the fifth face f5 are each a convex curved face, and the first tapering face f6a and second tapering face f6b on the sixth face f6 are each a convex curved face, one length-direction end (left end in FIG. 6) of each of the several first internal electrode layers 14 close to these faces and one length-direction end (right end in FIG. 6) of each of the several second internal electrode layers 15 close to these faces are curved inward, respectively. It is also clear from FIGS. 5A and 5B that, because the fifth face f5 is a convex curved face except for the parts corresponding to the first tapering face f5a and second tapering face f5b, and the sixth face f6 is a convex curved face except for the parts corresponding to the first tapering face f6a and second tapering face f6b, both width-direction ends (left and right ends in FIG. 5A) of each of the several first internal electrode layers 14 close to these faces and both width-direction ends (left and right ends in FIG. 5B) of each of the several second internal electrode layers 15 close to these faces are also curved inward, respectively.

It should be noted that, while the first tapering face f5a, second tapering face f5b, first tapering face f6a, and second tapering face f6b shown in FIGS. 2 to 6 are roughly the same, respectively, in terms of their length-direction dimension and configuration of convex curved face, each can have a slightly different length-direction dimension or a slightly different configuration of convex curved face. Also, the first tapering face f5a, second tapering face f5b, first tapering face f6a, and second tapering face f6b need not all be a convex curved face having a single radius of curvature; instead, they can each be a curved face whose radius of curvature varies but which assumes the shape of a convex curved face overall, or a combination of multiple curved faces of different shapes that together assume the shape of a convex curved face, or a face with some roughly flat areas that assumes the shape of a convex curved face overall, for example.

The first external electrode 12 has a first part 12a along the first face f1 of the capacitor body 11, a second part 12b along the fifth face f5 (excluding the first tapering face f5a) of the capacitor body 11, and a third part 12c along the first tapering face f5a on the fifth face f5 of the capacitor body 11. On the other hand, the second external electrode 13 has a first part 13a along the second face f2 of the capacitor body 11, a second part 13b along the fifth face f5 (excluding the second tapering face f5b) of the capacitor body 11, and a third part 13c along the second tapering face f5b on the fifth face f5 of the capacitor body 11. It should be noted that the first external electrode 12 and second external electrode 13 have roughly the same thickness, except at their outer peripheries, respectively. Although not illustrated, the first external electrode 12 and second external electrode 13 each have a two-layer structure constituted by a base film contacting the exterior face of the capacitor body 11 and a surface film contacting the exterior face of the base film, or a multi-layer structure constituted by a base film, a surface film, and at least one intermediate film in between.

Figure 3:
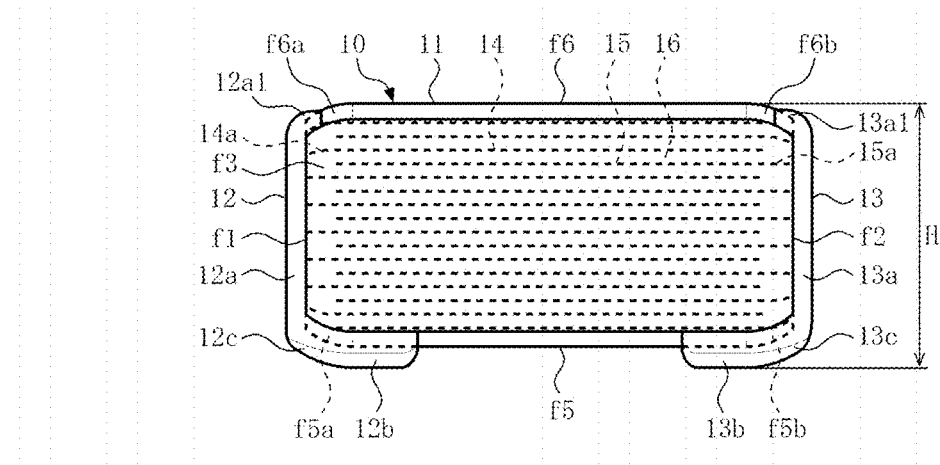
FIG. 3 is a view of the multilayer ceramic capacitor shown in FIG. 2 from the third face f3 side of the capacitor body.
Figure 4:
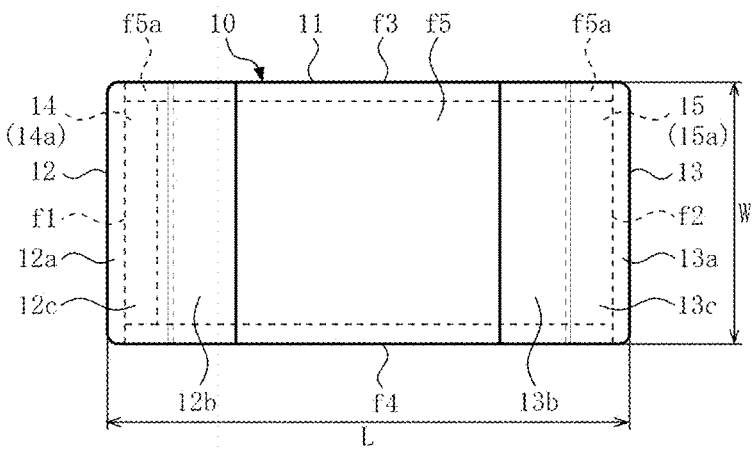
FIG. 4 is a view of the multilayer ceramic capacitor shown in FIG. 2 from the fifth face f5 side of the capacitor body.

As shown in FIGS. 3, 5A, and 5B, the first part 12a of the first external electrode 12 has a part 12a1 that extends slightly onto the first tapering face f6a on the sixth face f6 of the capacitor body 11, while the first part 13a of the second external electrode 13 has a part 13a1 that extends slightly onto the second tapering face f6b on the sixth face f6 of the capacitor body 11. Also, the third part 12c of the first external electrode 12 along the first tapering face f5a on the fifth face f5 of the capacitor body 11 has a shape corresponding to the first tapering face f5a, while the third part 13c of the second external electrode 13 along the second tapering face f5b on the fifth face f5 of the capacitor body 11 has a shape corresponding to the second tapering face f5b.

Regarding the materials, etc., preferably a dielectric ceramic whose primary component is barium titanate, strontium titanate, calcium titanate, magnesium titanate, calcium zirconate, calcium titanate zirconate, barium zirconate, titanium oxide, etc., or more preferably a dielectric ceramic of ε>1000 or Class 2 (high dielectric constant type), can be used for the capacitor body 11, except for each first internal electrode layer 14 and each second internal electrode layer 15.

Also, preferably a good conductor whose primary component is nickel, copper, palladium, platinum, silver, gold, alloy thereof, etc., can be used for each first internal electrode layer 14 and each second internal electrode layer 15.

In addition, the base film of the first external electrode 12 and that of the second external electrode 13 are each constituted by a baked film or plating film, for example, and preferably a good conductor whose primary component is nickel, copper, palladium, platinum, silver, gold, alloy thereof, etc., can be used for such base film. The surface film is constituted by a plating film, for example, and preferably a good conductor whose primary component is copper, tin, palladium, gold, zinc, alloy thereof, etc., can be used for such surface film. The intermediate film is constituted by a plating film, for example, and preferably a good conductor whose primary component is platinum, palladium, gold, copper, nickel, alloy thereof, etc., can be used for such intermediate film.

Figure 7:
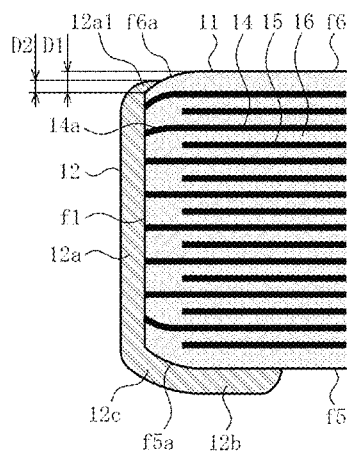
FIG. 7 is a partially enlarged view of FIG. 6.
Figure 8A:
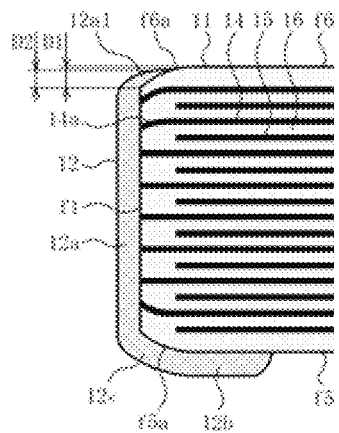
FIG. 8A and FIG. 8B are drawings, each showing a condition where the end height of the first part of the first external electrode is different from FIG. 7.
Figure 8B:
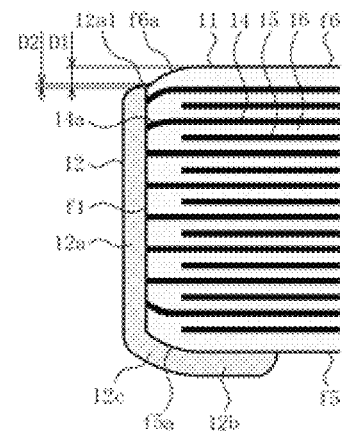

Next, the end height of the first part 12a of the first external electrode 12 and the end height of the first part 13a of the second external electrode 13 are explained using FIGS. 7 through 8B.

It should be noted that, although the first external electrode 12 and a part of the capacitor body 11 are shown and the second external electrode 13 is not illustrated in FIGS. 7 through 8B, the following also applies to the end height of the first part 13a of the second external electrode 13.

In FIG. 7, which is a partially enlarged view of FIG. 6, D1 shows the height-direction dimension of the first tapering face f6a on the sixth face f6 of the capacitor body 11, while D2 shows the height-direction dimension of the part 12a1 extending onto the first tapering face f6a on the first part 12a (the end of the part 12a1 is hereinafter referred to as the "end of the first part 12a"), where, in FIG. 7 the height-direction dimension D2 is roughly one-half the height-direction dimension D1. FIG. 8A and FIG. 8B are drawings, each showing a condition where the end height of the first part 12a of the first external electrode 12 is different from FIG. 7, where the height-direction dimension D2 is close to the height-direction dimension D1 in FIG. 8A, while the height-direction dimension D2 is much smaller than the height-direction dimension D1 in FIG. 8B.

In the conditions shown in FIG. 7, FIG. 8A, and FIG. 8B, the end of the first part 12a of the first external electrode 12 does not project upward beyond the sixth face f6 of the capacitor body 11, and therefore the height H of the multilayer ceramic capacitor 10 does not change. Also, in the conditions shown in FIG. 7, FIG. 8A, and FIG. 8B, the end of each first internal electrode layer 14 is connected to the first part 12a of the first external electrode 12, which is good from the viewpoint of connection. In other words, the multilayer ceramic capacitor 10 does not change its height H or cause poor connection even when the height-direction dimension D2 changes within the range of the height-direction dimension D1.

That is to say, the height-direction dimension D1 of the first tapering face f6a on the sixth face f6 of the capacitor body 11 functions to accommodate an error in the end height of the first part 12a of the first external electrode 12, and, although not illustrated, the height-direction dimension D1 of the second tapering face f6b on the sixth face f6 of the capacitor body 11 also functions to accommodate an error in the end height of the first part 13a of the second external electrode 13. This means that, even when the thickness of the margin part on the sixth face f6 side of the capacitor body 11 is made smaller, any error in the end height of the first part 12a of the first external electrode 12 or error in the end height of the first part 13a of the second external electrode 13 can be accommodated by the height-direction dimension D1, and therefore the end height of the first part 12a or that of the first part 13a need not be managed at high accuracy in order to avoid height change or poor connection.

Next, two manufacturing examples appropriate for the manufacture of the multilayer ceramic capacitor 10 are explained by citing the symbols in FIGS. 2 to 6 as deemed appropriate.

First Manufacturing Example

For the manufacture, a ceramic slurry containing dielectric ceramic powder, and an electrode paste containing good conductor powder, are prepared. Next, the ceramic slurry is coated on the surface of carrier films and then dried, to prepare first green sheets. Also, the electrode paste is printed on the surface of first green sheets and then dried, to prepare second green sheets on which internal electrode patterns are formed and which will become first internal electrode layers 14 and second internal electrode layers 15.

Next, a specified number of unit sheets cut out from the first green sheets are stacked and thermally bonded one by one, to prepare an area corresponding to one margin part in the height direction. Also, a specified number of unit sheets (including internal electrode patterns) cut out from the second green sheets are stacked and thermally bonded one by one, to prepare an area corresponding to the capacitive part. Furthermore, a specified number of unit sheets cut out from the first green sheets are stacked and thermally bonded one by one, to prepare an area corresponding to the other margin part in the height direction. Finally, the entire stack is thermally bonded for one last time to prepare an unsintered laminate sheet. In this preparation process of unsintered laminate sheet, the thickness and shape of the elastic sheet used for bonding, made of synthetic rubber, etc., are fashioned so that the surface curves corresponding to the fifth face f5 (including the first tapering face f5a and second tapering face f5b) and sixth face f6 (including the first tapering face f6a and second tapering face f6b) of the capacitor body 11 as shown in FIGS. 2 to 6, are formed on the top face and bottom face of the unsintered laminate sheet.

Next, the unsintered laminate sheet is cut to a grid to prepare unsintered chips, each corresponding to the capacitor body 11. Next, the multiple unsintered chips are sintered (including binder removal and sintering) all at once in an ambience and at a temperature profile appropriate for the dielectric ceramic powder contained in the ceramic slurry and for the good conductor powder contained in the electrode paste, to prepare sintered chips. Next, the multiple sintered chips are barreled all at once to round the corners and ridgelines, to prepare capacitor bodies 11.

Next, the first face f1 and second face f2 of each capacitor body 11 are dipped in an electrode paste (same as the aforementioned electrode paste or a different electrode paste containing a different type of good conductor powder), respectively, and then dried, followed by baking, to form a base film for the external electrodes. It should be noted that this base film can also be formed by sputtering, vacuum deposition, or other dry plating method that forms a good conductor film on the first face f1 and second face f2 of the capacitor body 11, respectively.

Next, an electrode paste (same as the aforementioned electrode paste or a different electrode paste containing a different type of good conductor powder) is printed on both length-direction ends of the fifth face f5 of the capacitor body 11, respectively, and then dried, followed by baking, to form another base film for the external electrodes in a manner continuing from the aforementioned base film. It should be noted that this base film can also be formed by sputtering, vacuum deposition, or other dry plating method that forms a good conductor film on both length-direction ends of the fifth face f5 of the capacitor body 11, respectively.

Next, a surface film covering the two continuous base films, or an intermediate film and a surface film, is/are formed by electroplating, electroless plating, or other wet plating method, or by sputtering, vacuum deposition, or other dry plating method, to prepare a first external electrode 12 and a second external electrode 13, respectively.

Second Manufacturing Example

For the manufacture, a ceramic slurry containing dielectric ceramic powder, and an electrode paste containing good conductor powder, are prepared. Next, the ceramic slurry is coated on the surface of carrier films and then dried, to prepare first green sheets. Also, the electrode paste is printed on the surface of first green sheets and then dried, to prepare second green sheets on which internal electrode patterns are formed and which will become first internal electrode layers 14 and second internal electrode layers 15. Furthermore, the electrode paste is printed on the surface of first green sheets and then dried, to prepare third green sheets on which base patterns are formed. These base patterns are aggregates of roughly rectangular patterns corresponding to the base film at the second part 12b of the first external electrode 12 and those corresponding to the base film at the second part 13b of the second external electrode 13.

Next, a specified number of unit sheets cut out from the first green sheets are stacked and thermally bonded one by one, to prepare an area corresponding to one margin part in the height direction. Also, a specified number of unit sheets (including internal electrode patterns) cut out from the second green sheets are stacked and thermally bonded one by one, to prepare an area corresponding to the capacitive part. Furthermore, a specified number of unit sheets cut out from the first green sheets are stacked and thermally bonded one by one, and then unit sheets (including base patterns) cut out from the third green sheets are stacked and thermally bonded one by one, to prepare an area corresponding to the other margin part in the height direction. Finally, the entire stack is thermally bonded for one last time to prepare an unsintered laminate sheet. In this preparation process of unsintered laminate sheet, the thickness and shape of the elastic sheet used for bonding, made of synthetic rubber, etc., are fashioned so that the surface curves corresponding to the fifth face f5 (including the first tapering face f5a and second tapering face f5b) and sixth face f6 (including the first tapering face f6a and second tapering face f6b) of the capacitor body 11 as shown in FIGS. 1A to 5B, are formed on the top face and bottom face of the unsintered laminate sheet.

Next, the unsintered laminate sheet is cut to a grid to prepare unsintered chips, each corresponding to the capacitor body 11. These sintered chips each have a base pattern present on both length-direction ends of the face corresponding to the fifth face f5 of the capacitor 11. Next, the multiple unsintered chips are sintered (including binder removal and sintering) all at once in an ambience and at a temperature profile appropriate for the dielectric ceramic powder contained in the ceramic slurry and for the good conductor powder contained in the electrode paste, to prepare sintered chips. Next, the multiple sintered chips are barreled all at once to round the corners and ridgelines, to prepare capacitor bodies 11. These capacitor bodies 11 each have a base film for the second part 12b of the first external electrode 12 on one of both length-direction ends of the fifth face f5, as well as a base film for the second part 13b of the second external electrode 13 on the other end.

Next, the first face f1 and second face f2 of each capacitor body 11 are dipped in an electrode paste (same as the aforementioned electrode paste or a different electrode paste containing a different type of good conductor powder), respectively, and then dried, followed by baking, to form another base film for the external electrodes in a manner continuing from the aforementioned base film. It should be noted that this base film can also be formed by sputtering, vacuum deposition, or other dry plating method that forms a good conductor film on the first face f1 and second face f2 of the capacitor body 11, respectively.

Next, a surface film covering the two continuous base films, or an intermediate film and a surface film, is/are formed by electroplating, electroless plating, or other wet plating method, or by sputtering, vacuum deposition, or other dry plating method, to prepare a first external electrode 12 and a second external electrode 13, respectively.

Next, the effects achieved by the multilayer ceramic capacitor 10 are explained.

(1) With the multilayer ceramic capacitor 10, the sixth face f6 of the capacitor body 11 has, over the entire width direction and at a position adjacent to the first face f1, a first tapering face f6a that decreases the height-direction dimension of the first face f1, and also has, over the entire width direction and at a position adjacent to the second face f2, a second tapering face f6b that decreases the height-direction dimension of the second face f2, wherein the height-direction dimension D1 of the first tapering face f6a on the sixth face f6 is constituted in a manner accommodating an error in the end height of the first part 12a of the first external electrode 12, while the height-direction dimension D1 of the second tapering face f6b on the sixth face f6 is constituted in a manner accommodating an error in the end height of the first part 13a of the second external electrode 13.

This means that, even when the thickness of the margin part on the sixth face f6 side of the capacitor body 11 is made smaller, any error in the end height of the first part 12a of the first external electrode 12 or error in the end height of the first part 13a of the second external electrode 13 can be accommodated by the height-direction dimension D1. Accordingly, the end height of the first part 12a or that of the first part 13a need not be managed at high accuracy in order to avoid height change or poor connection, and the first external electrode 12 and second external electrode 13 of roughly L shape can be formed properly.

(2) With the multilayer ceramic capacitor 10, the first tapering face f6a on the sixth face f6 of the capacitor body 11 is a convex curved face having a bulged center in the width direction and inclined toward the first face f1, while the second tapering face f6b on the sixth face f6 is a convex curved face having a bulged center in the width direction and inclined toward the second face f2. This means that, even when the end of the first part 12a of the first external electrode 12 extends onto the first tapering face f6a on the sixth face f6 of the capacitor body 11 or the end of the first part 13a of the second external electrode 13 extends onto the second tapering face f6b on the sixth face f6 of the capacitor body 11, the entire surface of the first part 12a and that of the first part 13a can have a smooth finish.

Next, the verification results of the aforementioned effects, especially the verification results pertaining to proper formation of the first external electrode 12 and second external electrode 13, are explained.

Figure 1B:
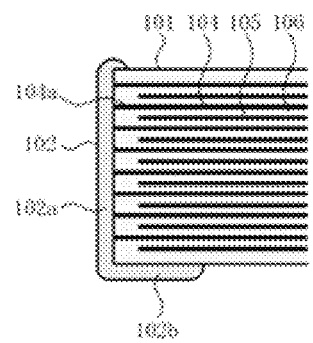
FIG. 1B and FIG. 1C are drawings explaining problems that can occur on the multilayer ceramic capacitor shown in FIG. 1A.
Figure 1C:
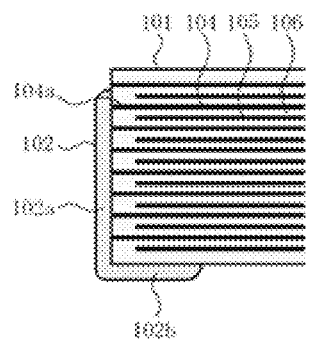
Figure 2:
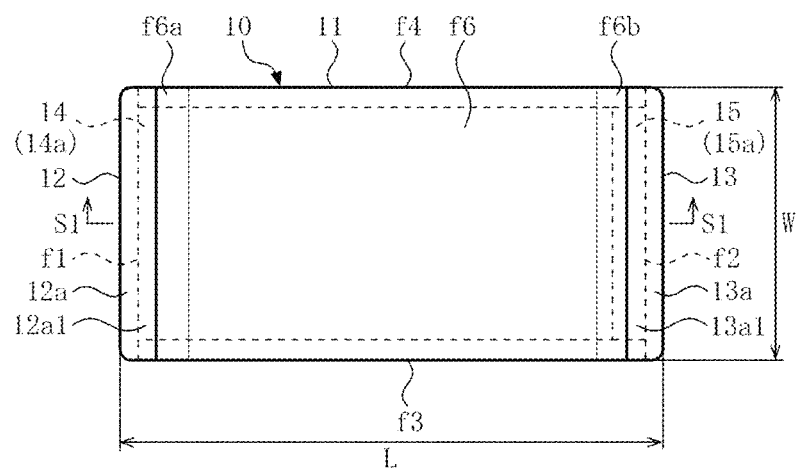
FIG. 2 is a view of a multilayer ceramic capacitor to which the present invention is applied, from the sixth face f6 side of the capacitor body.

For verification, 100 evaluation multilayer ceramic capacitors each corresponding to the multilayer ceramic capacitor 10 shown in FIGS. 2 to 6 and 100 comparison multilayer ceramic capacitors each corresponding to the multilayer ceramic capacitor 100 shown in FIGS. 1A through 1C, were manufactured according to <First Manufacturing Example> above. The specifications of the evaluation multilayer ceramic capacitors, and the specifications of the comparison multilayer ceramic capacitors are described below. It should be noted that all specification values are design reference values and do not include manufacturing tolerance.

<Specifications of Evaluation Multilayer Ceramic Capacitors (Citing the Symbols in FIGS. 2 to 6)>

The multilayer ceramic capacitor 10 has a length L of 400 μm, width W of 200 μm, and height H of 200 μm.

The capacitor body 11 has a length of 370 μm, width of 200 μm, and height of 185 μm.

The primary component of the capacitor body 11, excluding the first internal electrode layers 14 and second internal electrode layers 15, is barium titanate.

The primary component of the first internal electrode layers and second internal electrode layers is nickel, each layer is 0.5 μm thick, and there are 145 first internal electrode layers and 145 second internal electrode layers.

The thickness of the dielectric layers 16 present between the first internal electrode layers 14 and second internal electrode layers 15 is 0.5 μm.

The thickness of the width-direction margin part and that of the height-direction margin part, of the capacitor body 11, are both 15 μm.

The height-direction dimension D1 of the first tapering face 6a, and that of the second tapering face 6b, of the sixth face f6 of the capacitor body 11, are 10 μm.

The height-direction dimension D1 of the first tapering face 5a, and that of the second tapering face 5b, of the fifth face f5 of the capacitor body 11, are 10 μm.

The first external electrode 12 and second external electrode 13 each have a three-layer structure and a thickness of 15 μm, where the primary component of the base film is copper and its thickness is 10 μm, the primary component of the intermediate film is nickel and its thickness is 2 μm, and the primary component of the surface film is tin and its thickness is 3 μm.

<Specifications of Comparison Multilayer Ceramic Capacitors (Citing the Symbols in FIGS. 2 to 6)>

The comparison multilayer ceramic capacitors are same as with the evaluation multilayer ceramic capacitors, except that the sixth face f6 of the capacitor body 11 is roughly flat and has no first tapering face f6a or second tapering face f6b, while the fifth face f5 is roughly flat and has no first tapering face f5a or second tapering face f5b.

The effects were verified by observing the 100 evaluation multilayer ceramic capacitors manufactured, as well as the 100 comparison multilayer ceramic capacitors manufactured, to see whether or not the end height of the first part 12a of the first external electrode 12 and the end height of the first part 13a of the second external electrode 13 are higher than the sixth face f6 of the capacitor body 11. As a result of the observation, the end height of the first part 12a of the first external electrode 12 and the end height of the first part 13a of the second external electrode 13 were higher than the sixth face f6 of the capacitor body 11 on none of the 100 evaluation multilayer ceramic capacitors, whereas the end height of the first part 12a of the first external electrode 12 and the end height of the first part 13a of the second external electrode 13 were higher than the sixth face f6 of the capacitor body 11 on 33 of the 100 comparison multilayer ceramic capacitors.

It should be added that, in <First Manufacturing Example> above, the base film at the first part 12a of the first external electrode 12 and that at the first part 13a of the second external electrode 13 are formed by dipping in and baking the electrode paste and, during the base film formation in the manufacture of the evaluation multilayer ceramic capacitors and the comparison multilayer ceramic capacitors, attention was paid to cover the entire exposed end of each first internal electrode layer 14 and the entire exposed end of each second internal electrode layer 15, and consequently there was no such incidence as shown in FIG. 1C where the exposed end of any first internal electrode layer 14 was not connected to the first part 12a of the first external electrode 12 or the exposed end of any second internal electrode layer 15 was not connected to the first part 13a of the second external electrode 13.

The following is an additional explanation on the height-direction dimension D1 of the first tapering face f6a and that of the second tapering face f6b, on the sixth face f6 of the capacitor body 11, as explained earlier using FIGS. 7 through 8B, by considering the specifications of the evaluation multilayer ceramic capacitor, etc.

The height-direction dimension D1 of the first tapering face f6a, and that of the second tapering face f6b, on the sixth face f6 of the capacitor body 11 of the evaluation multilayer ceramic capacitor, are 10 μm, which corresponds to two-thirds of the thickness (15 μm) of the height-direction margin of the capacitor body 11. It is feasible from the viewpoint of manufacturing to increase this height-direction dimension D1 beyond 15 μm; however, increasing the height-direction dimension D1 excessively causes the degree of warping of the first internal electrode layers 14 and second internal electrode layers 15 close to the first tapering face f6a and second tapering face f6b to increase, which in turn gives rise to a concern of short-circuiting between a first internal electrode layer 14 and a second internal electrode layer 15. Accordingly, in consideration of the specifications of prototypes that were manufactured along with the evaluation multilayer ceramic capacitors, desirably the maximum limit of the height-direction dimension D1 of the first tapering face f6a and that of the second tapering face f6b, on the sixth face f6 of the capacitor body 11, is capped at the thickness of the height-direction margin of the capacitor body 11.

Next, examples of variation of the multilayer ceramic capacitor 10 are explained.

First Example of Variation

In FIGS. 2 to 6, the fifth face f5 of the capacitor body 11 has the first tapering face f5a and second tapering face f5b, and is a convex curved face with a bulged center in the width direction except for the parts corresponding to the first tapering face f5a and second tapering face f5b; however the aforementioned effects depend on the configuration of the sixth face f6, which means that the first tapering face f5a and second tapering face f5b can be eliminated from the fifth face f5 of the capacitor body 11, to make the entire fifth face f5a a convex curved face with a bulged center in the width direction, or to make the entire fifth face f5 a roughly flat surface.

Second Example of Variation

In FIGS. 2 to 6, the width-direction dimension of the first external electrode 12 corresponds to the width-direction dimension (width W) of the capacitor body 11, while the width-direction dimension of the second external electrode 13 corresponds to the width-direction dimension (width W) of the capacitor body 11; however, effects similar to those explained above can still be achieved even when the width-direction dimensions of the first external electrode 12 and second external electrode 13 are slightly smaller than the width W, respectively.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-035707, filed Feb. 26, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor comprising:
    (1) a capacitor body having a first face and a second face that are opposing faces in a length direction, a third face and a fourth face that are opposing faces in a width direction, and a fifth face and a sixth face that are opposing faces in a height direction, as well as a built-in capacitive part constituted by multiple first internal electrode layers and multiple second internal electrode layers stacked alternately with dielectric layers in between;
    (2) a first external electrode having a first part along the first face over an entire width direction, and a second part along the fifth face, of the capacitor body, where an end of each of the multiple first internal electrode layers is connected to the first part of the first external electrode; and
    (3) a second external electrode having a first part along the second face over an entire width direction, and a second part along the fifth face, of the capacitor body, where an end of each of the multiple second internal electrode layers is connected to the first part of the second external electrode;
    wherein the sixth face of the capacitor body has a planar portion extending in an area where the first and second internal electrode layers overlap as viewed from above, and has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;
    wherein a height-direction dimension of the first tapering face on the sixth face is constituted in a manner accommodating an error in an end height of the first part of the first external electrode, while a height-direction dimension of the second tapering face on the sixth face is constituted in a manner accommodating an error in an end height of the first part of the second external electrode; and
    wherein the first and second external electrodes have roughly an L shape as viewed from a direction toward the third or fourth face, an end of each of the first and second external electrodes is a highest point of each of the first and second external electrodes in the height direction, and the end of each of the first and second external electrodes is disposed on the corresponding first or second tapering face and lower than the sixth face in the height direction, wherein the first tapering face on the sixth face of the capacitor body is a convex curved face having a bulged center in the width direction and inclined toward the first face, while the second tapering face on the sixth face is a convex curved face having a bulged center in the width direction and inclined toward the second face.

2. A multilayer ceramic capacitor according to claim 1, wherein the first tapering face and second tapering face on the sixth face of the capacitor body are convex curved faces, respectively, that satisfy a condition of h1>h2>h3 where h1 represents a maximum height-direction dimension between the sixth face and fifth face of the capacitor body, h2 represents a maximum height-direction dimension of the first face and that of the second face of the capacitor body, respectively, and h3 represents a minimum height-direction dimension of the first face and that of the second face of the capacitor body, respectively.

3. A multilayer ceramic capacitor according to claim 1, wherein the sixth face of the capacitor body is a convex curved face with a bulged center in the width direction, except for the parts corresponding to the first tapering face and second tapering face.

4. A multilayer ceramic capacitor according to claim 2, wherein the sixth face of the capacitor body is a convex curved face with a bulged center in the width direction, except for the parts corresponding to the first tapering face and second tapering face.

5. A multilayer ceramic capacitor according to claim 2, wherein the multilayer ceramic capacitor has a length (L), a width (W), and a height (H) which satisfy one of the following relationships:

L>W=H,

L>W>H,

L>H>W,

W>L=H,

W>L>H, or

W>H>L.

6. A multilayer ceramic capacitor according to claim 1, wherein the number of dielectric layers provided in the multilayer ceramic capacitor is 13 or less.

7. A multilayer ceramic capacitor according to claim 1, wherein the first and second internal electrode layers are constituted by a conductor whose primary component is nickel, copper, palladium, platinum, silver, gold, or alloy of the foregoing.

8. A multilayer ceramic capacitor according to claim 1, wherein the first and second external electrodes are each provided with a base film formed between the capacitor body and each of the first and second external electrodes, wherein the base film is constituted by a conductor whose primary component is nickel, copper, palladium, platinum, silver, gold, or alloy of the foregoing.

9. A multilayer ceramic capacitor, comprising:
(1) a capacitor body having a first face and a second face that are opposing faces in a length direction, a third face and a fourth face that are opposing faces in a width direction, and a fifth face and a sixth face that are opposing faces in a height direction, as well as a built-in capacitive part constituted by multiple first internal electrode layers and multiple second internal electrode layers stacked alternately with dielectric layers in between;
(2) a first external electrode having a first part along the first face over an entire width direction, and a second part along the fifth face, of the capacitor body, where an end of each of the multiple first internal electrode layers is connected to the first part of the first external electrode; and
(3) a second external electrode having a first part along the second face over an entire width direction, and a second part along the fifth face, of the capacitor body, where an end of each of the multiple second internal electrode layers is connected to the first part of the second external electrode; wherein the sixth face of the capacitor body has a planar portion extending in an area where the first and second internal electrode layers overlap as viewed from above, and has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;
wherein a height-direction dimension of the first tapering face on the sixth face is constituted in a manner accommodating an error in an end height of the first part of the first external electrode, while a height-direction dimension of the second tapering face on the sixth face is constituted in a manner accommodating an error in an end height of the first part of the second external electrode; wherein the first and second external electrodes have roughly an L shape as viewed from a direction toward the third or fourth face, an end of each of the first and second external electrodes is a highest point of each of the first and second external electrodes in the height direction, and the end of each of the first and second external electrodes is disposed on the corresponding first or second tapering face and lower than the sixth face in the height direction, wherein, among the first to sixth faces, only the first face, the fifth face, and the first tapering faces are provided with the first external electrode, and, among the first to sixth faces, only the second face, the fifth face, and the second tapering face are provided with the second external electrode,
wherein the first and second external electrodes constitute ail external electrodes provided in the multilayer ceramic capacitor; and wherein the first tapering face and second tapering face on the sixth face of the capacitor body are convex curved faces, respectively, that satisfy a condition of h1>h2>h3 where h1 represents a maximum height-direction dimension between the sixth face and fifth face of the capacitor body, h2 represents a maximum height-direction dimension of the first face and that of the second face of the capacitor body, respectively, and h3 represents a minimum height-direction dimension of the first face and that of the second face of the capacitor body, respectively.

10. A multilayer ceramic capacitor according to claim 9, wherein the sixth face of the capacitor body is a convex curved face with a bulged center in the width direction, except for the parts corresponding to the first tapering face and second tapering face.

11. A multilayer ceramic capacitor according to claim 9, wherein the multilayer ceramic capacitor has a length (L), a width (W), and a height (H) which satisfy one of the following relationships:

L>W=H,

L>W>H,

L>H>W,

W>L=H,

W>L>H, or

W>H>L.

12. A multilayer ceramic capacitor according to claim 9, wherein the number of dielectric layers provided in the multilayer ceramic capacitor is 13 or less.

13. A multilayer ceramic capacitor according to claim 9, wherein the first and second internal electrode layers are constituted by a conductor whose primary component is nickel, copper, palladium, platinum, silver, gold, or alloy of the foregoing.

14. A multilayer ceramic capacitor according to claim 9, wherein the first and second external electrodes are each provided with a base film formed between the capacitor body and each of the first and second external electrodes, wherein the base film is constituted by a conductor whose primary component is nickel, copper, palladium, platinum, silver, gold, or alloy of the foregoing.

15. A multilayer ceramic capacitor comprising:
  (1) a capacitor body having a first face and a second face that are opposing laces in a length direction, a third face and a fourth face that are opposing faces in a width direction, and a fifth face and a sixth face that are opposing faces in a height direction, as well as a built-in capacitive part constituted by multiple first internal electrode layers and multiple second internal electrode layers stacked alternately with dielectric layers in between;
  (2) a first external electrode having a first part along the first face over an entire width direction, and a second part along the fifth face, of the capacitor body, where an end of each of the multiple first internal electrode layers is connected to the first part of the first external electrode; and
  (3) a second external electrode having a first part along the second face over an entire width direction, and a second part along the fifth face, of the capacitor body, where an end of each of the multiple second internal electrode layers is connected to the first part of the second external electrode;
  wherein the sixth face of the capacitor body has a planar portion extending in an area where the first and second internal electrode layers overlap as viewed from above, and has, over an entire width direction and at a position adjacent to the first face, a first tapering face that decreases a height-direction dimension of the first face, and also has, over an entire width direction and at a position adjacent to the second face, a second tapering face that decreases a height-direction dimension of the second face;
  wherein a height-direction dimension of the first tapering face on the sixth face is constituted in a manner accommodating an error in an end height of the first part of the first external electrode, while a height-direction dimension of the second tapering face on the sixth face is constituted in a manner accommodating an error in an end height of the first part of the second external electrode; and wherein the first and second external electrodes have roughly an L shape as viewed from a direction toward the third or fourth face, an end of each of the first and second external electrodes is a highest point of each of the first and second external electrodes in the height direction, and the end of each of the first and second external electrodes is disposed on the corresponding first or second tapering face and lower than the sixth face in the height direction,
  wherein the sixth face of the capacitor body is a convex curved face with a bulged center in the width direction, except for the parts corresponding to the first tapering face and second tapering face.

16. A multilayer ceramic capacitor according to claim 15, wherein an upper end of the first part of the first external electrode is within the first tapering face and in contact therewith, and an upper end of the first part of the second external electrode is within the second tapering face and in contact therewith.

17. A multilayer ceramic capacitor according to claim 15, wherein the multilayer ceramic capacitor has a length (L), a width (W), and a height (H) which satisfy one of the following relationships:

L>W=H,

L>W>H,

L>H>W,

W>L=H,

W>L>H, or

W>H>L.

18. A multilayer ceramic capacitor according to claim 15, wherein the number of dielectric layers provided in the multilayer ceramic capacitor is 13 or less.

19. A multilayer ceramic capacitor according to claim 15, wherein the first and second internal electrode layers are constituted by a conductor whose primary component is nickel, copper, palladium, platinum, silver, gold, or alloy of the foregoing.

20. A multilayer ceramic capacitor according to claim 15, wherein the first and second external electrodes are each provided with a base film formed between the capacitor body and each of the first and second external electrodes, wherein the base film is constituted by a conductor whose primary component is nickel, copper, palladium, platinum, silver, gold, or alloy of the foregoing.

* * * * *

UNITED STATES PATENT AND TRADEMARK OFFICE
CERTIFICATE OF CORRECTION

PATENT NO. : 11,043,332 B2  
APPLICATION NO. : 15/438618  
DATED : June 22, 2021  
INVENTOR(S) : Toru Makino Page 1 of 1

It is certified that error appears in the above-identified patent and that said Letters Patent is hereby corrected as shown below:

In the Claims

At Column 14, Line 66, in Claim 1, after the (","), the clause beginning with "wherein" should be started as a new line.

At Column 16, Line 16, in Claim 9, after the (";"), the clause beginning with "wherein" should be started as a new line.

At Column 16, Line 35, in Claim 9, after the (";"), the clause beginning with "wherein" should be started as a new line.

At Column 16, Line 51, in Claim 9, the clause beginning with "wherein" shouldn't be started as a new line, but should follow the (",") at Column 16, Line 50.

At Column 16, Line 54, in Claim 9, after "and", the clause beginning with "wherein" should be started as a new line.

At Column 18, Line 12, in Claim 15, after "and", the clause beginning with "wherein" should be started as a new line.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*